Aug. 28, 1945.    G. BAER    2,383,439
CAMERA OBJECTIVE HOLDER MOUNT
Filed Feb. 26, 1944
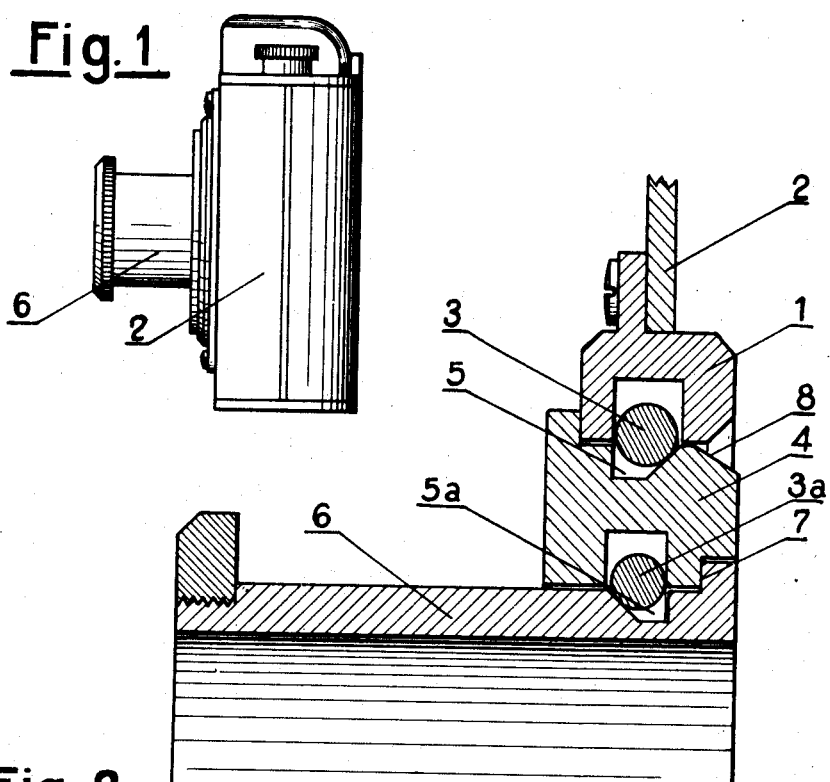
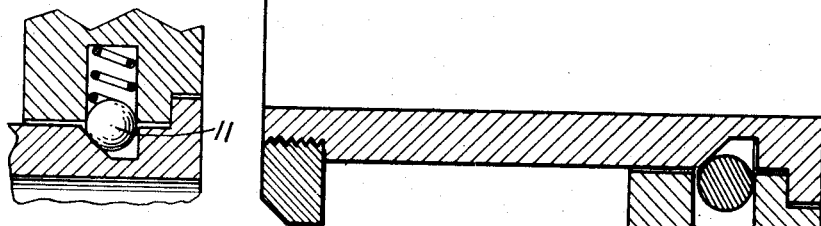
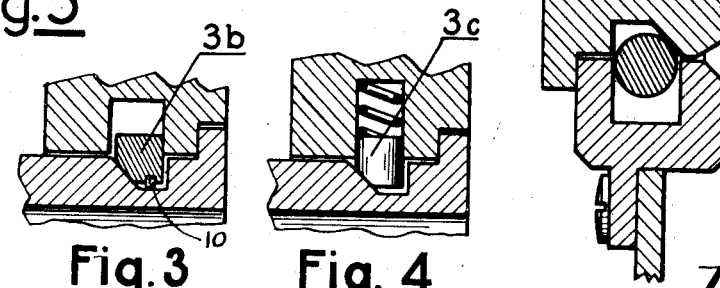
Inventor
G. Baer
By Glascock Downing Nichols
Attys Patented Aug. 28, 1945

2,383,439

UNITED STATES PATENT OFFICE 2,383,439

CAMERA OBJECTIVE HOLDER MOUNT

Georges Baer, Paudex-Lausanne, Switzerland

Application February 26, 1944, Serial No. 524,050
In Germany May 17, 1943

10 Claims. (Cl. 88—57)

The object of the present invention is a camera objective holder mount in which the objective holder tube can slide in the camera casing between two positions for operation and rest determined by stops. This mount is characterized by at least one elastic arresting member mounted in one of the elements objective holder tube and casing, and acting on a conical surface provided on the other element, in such a way as to exert on the objective holder tube an axial thrust tending to keep it against the stop determining the operating position.

The attached drawing represents, by way of example, an embodiment of the invention.

Fig. 1 is a general view showing the position of the objective holder mount in the camera.

Fig. 2 is an axial section of the mount and Figs. 3 to 5 show alternative constructions of a detail.

In the embodiment represented, the objective holder mount comprises a first ring 1 screwed by its external flange on the rim of an aperture cut in the wall 2 of the camera casing. This first ring presents a circular inner groove of rectangular cross-section, both sides of which are disposed at right angle with the axis of the objective. In this groove is fitted a spring 3 made of a steel wire loop of circular cross-section. The inner diameter of this spring is slightly inferior to that of the first ring 1.

A second ring 4 is mounted with slight friction in the first one and comes to abut against its outer face by means of an external flange. This ring presents an outer circular groove 5 of trapezoidal cross-section, the inner side of which is conical, i. e., inclined in respect of the axis of the objective, whilst the opposite side is disposed at right angle with the axis of the objective. Internally, this second ring presents a groove similar to that of the first ring with a spring 3a like the spring 3 but weaker. This spring engages into a groove 5a provided on the objective holder tube 6; this groove is similar to the groove 5 but directed in the opposite direction along the axis of the objective, that is to say, with the conical side towards the outside of the camera.

The objective holder tube 6 is also fitted with slight friction in the ring 4 and presents a rear flange intended to abut against the inner face of this ring in a recess 7 provided to that effect.

In a simpler construction, the ring 4 can be mounted directly in the wall 2 of the camera. The springs 3 and 3a can be of rectangular or square cross-section with at least one rounded or bevelled angle 3b. One can also provide radial spring pressed pushers 3c as shown in Fig. 4, or simply balls 11 with a radial spring shown in Fig. 5.

The operation of this objective holder mount is as follows:

At rest, the objective holder tube 6 is thrust fully inside the camera, so that the inner surface of its front flange bears on the outer surface of the ring 4.

For using the camera, one pulls the objective holder tube 6 outwards, until the spring 3a engages into the groove 5a, whereby the spring presses upon the conical side of the groove, so that the objective holder tube is maintained at the end of its travel, i. e., with its rear flange bearing against the inner surface 7 of the ring 4. In this way, the position of the objective is secured with precision.

When it is required to take the objective holder tube right out of the camera, it suffices to exert on the former a slightly stronger outward pull, in order to compel the spring 3 to open sufficiently to let pass the ring 4. When one puts again the objective holder tube in position in the camera, the spring 3 ensures automatically that the objective comes at the exact distance, by compelling the ring 4 to set itself into the first ring 1, by the action of the spring 3 on the conical side of the outer groove 5 of the ring 4. The latter presents also a conical surface 8 designed to open the spring 3 when the ring 4 is being thrust into the first ring 1.

The advantage of this objective holder mount is thus to permit a rapid manipulation of the objective holder tube, and to insure at the same time that the distance of the objective be accurately maintained.

In order to make sure that the wire loop spring cooperating with the objective holder tube may not scratch its surface, one can cut in the inner side of the wire loop spring a circular groove designed to receive a smooth pad of non-metallic material or of soft metal as indicated at 10 in Fig. 3.

What I claim is:

1. In a camera objective holder mount in which the objective holder tube can slide axially in the camera casing between two positions for operation and rest determined by stops, in combination, an objective holder element, a casing element, stop means determining the operating position of the holder element, at least one elastic arresting member mounted in one of the elements and a conical surface provided on the other element, coacting with the arresting member in such a way as to exert on the objective holder element an axial thrust tending to keep it against the stop means.

2. In a camera objective holder mount in which the objective holder tube can slide axially between two positions for operation and rest, a casing element, a ring element receiving said tube, stop means, the ring element being movable axially into the casing element as far as an operating position determined by said stop means, a conical surface on one of the elements, at least one elastic arresting member carried by the other element and acting on said conical surface in such a way as to exert on the ring element an axial thrust tending to keep it against the stop means determining the operating position.

3. In a camera objective holder mount according to claim 1, the fact that the elastic arresting member comprises a wire loop spring mounted in a circular groove cut in one of the elements and acting on the conical side surface of a circular groove cut in the other element.

4. In a camera objective holder mount according to claim 1, the fact that the elastic arresting member comprises a wire loop spring mounted in a circular groove cut in one of the elements and acting on the conical side surface of a circular groove cut in the other element, the wire loop spring being of circular cross-section.

5. In a camera objective holder mount according to claim 1, the fact that the elastic arresting member comprises a wire loop spring mounted in a circular groove cut in one of the elements and acting on the conical side surface of a circular groove cut in the other element, the wire loop spring being of quadrangular cross-section with at least one rounded angle.

6. In a camera objective holder mount according to claim 1, the fact that the elastic arresting member comprises a wire loop spring mounted in a circular groove cut in one of the elements and acting on the conical side surface of a circular groove cut in the other element, the wire loop spring being of quadrangular cross-section with at least one bevelled angle.

7. In a camera objective holder mount according to claim 1, the fact that the elastic arresting member comprises a wire loop spring mounted in a circular groove cut in one of the elements and acting on the conical side surface of a circular groove cut in the other element, the wire loop spring presenting an inner groove containing a smooth non-metallic pad.

8. In a camera objective holder mount according to claim 1, the fact that the elastic arresting member comprises a wire loop spring mounted in a circular groove cut in one of the elements and acting on the conical side surface of a circular groove cut in the other element, the wire loop spring presenting an inner groove containing a smooth pad of soft metal.

9. In a camera objective holder mount according to claim 1, the fact that the elastic arresting member comprises at least one radial spring pusher.

10. In a camera objective holder mount according to claim 1, the fact that the elastic arresting member comprises at least one ball with radial spring.

GEORGES BAER.